United States Patent
Stib et al.

(10) Patent No.: US 8,981,744 B2
(45) Date of Patent: Mar. 17, 2015

(54) CIRCUIT FOR REGULATING AND MONITORING A SIGNAL CURRENT AND MEASUREMENT TRANSDUCER WITH SUCH A CIRCUIT

(75) Inventors: Ralph Stib, Schonau (DE); Wolfgang Trunzer, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 208 days.

(21) Appl. No.: 13/816,330

(22) PCT Filed: Jul. 11, 2011

(86) PCT No.: PCT/EP2011/061722
§ 371 (c)(1),
(2), (4) Date: Feb. 11, 2013

(87) PCT Pub. No.: WO2012/019840
PCT Pub. Date: Feb. 16, 2012

(65) Prior Publication Data
US 2013/0141065 A1    Jun. 6, 2013

(30) Foreign Application Priority Data

Aug. 12, 2010 (DE) .......................... 10 2010 039 271

(51) Int. Cl.
*G01D 3/08* (2006.01)
*G01D 5/14* (2006.01)
(Continued)

(52) U.S. Cl.
CPC .. *G05F 1/56* (2013.01); *G01D 3/08* (2013.01); *G01D 5/14* (2013.01); *G05B 1/03* (2013.01); *G05B 23/02* (2013.01); *G05F 1/561* (2013.01)
USPC .......................................... 323/273; 323/275

(58) Field of Classification Search
CPC .............. G01D 3/08; G01D 5/14; G05F 1/56; G05B 23/02
USPC .................. 323/273, 275, 279, 280, 281, 285
See application file for complete search history.

(56) References Cited

U.S. PATENT DOCUMENTS 6,629,638 B1   10/2003   Sanchez
6,820,220 B1 *  11/2004   Dominke et al. ............... 714/30
(Continued)

FOREIGN PATENT DOCUMENTS

DE           199 02 031 A1    7/2000
DE    10 2005 018 398 A1  10/2006
(Continued)

OTHER PUBLICATIONS

German Search Report dated Mar. 3, 2011, issued in Application No. 10 2010 039 271.5, in Munich, Germany.
(Continued)

*Primary Examiner* — Adolf Berhane
*Assistant Examiner* — Sisay G Tiku
(74) *Attorney, Agent, or Firm* — Bacon & Thomas, PLLC (57) ABSTRACT

A circuit for regulating and monitoring a signal current, comprising a regulating circuit; and a monitoring circuit. The regulating circuit comprises: a first controlled voltage source for outputting a target value dependent controlled voltage; a current adjust circuit for adjusting the signal current in dependence on the controlled voltage and a first feedback voltage by means of a potentiometer; and a first feedback path, with at least one first resistance element across which the signal current flows. The voltage drop across the resistance element or one of the voltages of the current adjust circuit dependent thereon is supplied as a first feedback voltage. The monitoring circuit comprises: a second controlled voltage source for outputting a second target value dependent controlled voltage; an analog monitoring circuit for determining the deviation between the second controlled voltage and a second feedback voltage; and a second feedback path with a resistance element across which the signal current flows, wherein the voltage drop across the resistance element or a voltage of the monitoring circuit dependent thereon is supplied as a second feedback voltage.

14 Claims, 5 Drawing Sheets

(51) Int. Cl.
  *G05F 1/56*  (2006.01)
  *G05B 1/03*  (2006.01)
  *G05B 23/02* (2006.01)

(56) References Cited

U.S. PATENT DOCUMENTS

| | | | |
|---|---|---|---|
| 7,411,375 B2* | 8/2008 | Konrad et al. | 323/273 |
| 2004/0194532 A1* | 10/2004 | Lally et al. | 73/1.82 |
| 2005/0030185 A1 | 2/2005 | Huisenga et al. | |
| 2008/0007307 A1 | 1/2008 | Freiburger et al. | |
| 2009/0243564 A1 | 10/2009 | Kajita | |
| 2011/0062942 A1* | 3/2011 | Karbula et al. | 324/76.11 |
| 2011/0309813 A1* | 12/2011 | Meier et al. | 323/299 |

FOREIGN PATENT DOCUMENTS

| | | | | |
|---|---|---|---|---|
| DE | 10 2008043178 | * | 10/2008 | ............ G05B 23/02 |
| DE | 10 2008 001 832 A1 | | 11/2009 | |
| DE | 10 2008 042 851 A1 | | 4/2010 | |
| DE | 10 2008 043 178 A1 | | 4/2010 | |

OTHER PUBLICATIONS

International Search Report on Patentability dated Dec. 28, 2011, issued in Application No. PCT/EP2011/061722, in Rijswijk, Netherlands.

International Search Report on Patentability dated Feb. 21, 2013, issued in Application No. PCT/EP2011/061722, in Geneva Switzerland.

* cited by examiner

CIRCUIT FOR REGULATING AND MONITORING A SIGNAL CURRENT AND MEASUREMENT TRANSDUCER WITH SUCH A CIRCUIT

TECHNICAL FIELD

The present invention relates to a circuit for regulating and monitoring a signal current, which represents a target value, in particular a measurement value or a regulating value, and a measurement transducer with such a circuit.

BACKGROUND DISCUSSION

In particular, in process automation technology, measurement transformers are employed that use this sort of signal current for outputting a measurement signal, between 4 and 20 mA by way of example. In particular, in conjunction with various safety requirements, SIL 2 (Safety Integrated Level 2) by way of example, it is required that errors in the transmission function of a measurement device be quickly and reliably recognized and signalized. A measurement transducer that comprises an appropriate monitoring function is disclosed in the patent publication DE 10 2008 001 832 A1. Here, an analog desired value is provided as a voltage value for adjusting the signal current following a digital determination of the measurement value. The voltage drop across a shunt resistor, through which the signal current flows, is evaluated in order to establish whether the signal current that is actually flowing equals the desired value. However, the described prior art cannot establish whether the provided desired value or the flowing current is actually still equivalent to the digitally determined measurement value. A renewed digitalization of the determined voltage drop across the shunt resistor does indeed offer a further possibility for verifying the transmission function, but this mode of operation is in some cases too slow, in particular in dynamic operations.

SUMMARY OF THE INVENTION

It is therefore an object of the invention to provide a circuit for improved monitoring of the signal current and a measurement transformer with such a circuit.

The invention provides a circuit for regulating and monitoring a signal current, which represents a target value, in particular a measurement value or a regulating value, wherein the circuit comprises a regulating circuit; and a monitoring circuit, wherein the regulating circuit comprises: a first controlled voltage source for outputting a target value dependent controlled voltage; a current adjust circuit for adjusting the signal current in dependence on the controlled voltage and a first feedback voltage by means of a potentiometer; and a first feedback path, with at least one first resistance element across which the signal current flows, wherein the voltage drop across the resistance element or one of the voltages of the current adjust circuit dependent thereon is supplied as a first feedback voltage; wherein the monitoring circuit according to the invention comprises: a second controlled voltage source for outputting a second target value dependent controlled voltage; an analog monitoring circuit for determining the deviation between the second controlled voltage and a second feedback voltage; and a second feedback path with a resistance element across which the signal current flows, wherein the voltage drop across the resistance element or a voltage of the monitoring circuit dependent thereon is supplied as a second feedback voltage.

In an embodiment of the invention, the first controlled voltage source and the second controlled voltage source each comprise an integrator circuit for integrating a pulse-width modulated reference voltage. In a further embodiment of the invention, both of the integrator circuits comprise essentially the same time constant.

In a further embodiment of the invention, the first controlled voltage source and the second controlled voltage source each comprise a reference voltage source for outputting a reference voltage.

In an alternative embodiment, the controlled voltage sources each comprise a D/A-converter (digital to analog), which are likewise each supplied by a reference voltage source.

In a further embodiment of the invention, the current adjust circuit comprises a first operational amplifier for controlling a transistor circuit by means of its output voltage, wherein the signal current is adjusted via the resistance of the transistor circuit, wherein the output voltage of the first operational amplifier depends on a deviation between the first controlled voltage and the first feedback voltage, wherein the monitoring circuit comprises a second operational amplifier for signalizing a deviation by means of its output voltage, the output voltage of the second operational amplifier depends on a deviation between the second controlled voltage and the second feedback voltage.

In a further development of this embodiment of the invention, a first input of the first operational amplifier is connected to a node to which the sum of the first controlled voltage and the first feedback voltage connects in the operation of the circuit, and wherein a second input of the first operational amplifier is connected to ground.

In a further development of this embodiment of the invention, the first feedback voltage connects to a first input of the first operational amplifier in the operation of the circuit, and the first controlled voltage connects to a second input of the first operational amplifier.

In a further development of this embodiment of the invention, a first input of the second operational amplifier is connected to a node to which the sum of the second controlled voltage and the second feedback voltage connects in the operation of the circuit, wherein the second input of the second operational amplifier is connected to ground.

In another further development of this embodiment of the invention, the first feedback voltage is connected to a first input of the second operational amplifier in the operation of the circuit, wherein the second controlled voltage is connected to a second input of the operational amplifier.

In a further embodiment of the invention, in the operation of the circuit, the voltage drop across the resistance element is connected to the current adjust circuit via the first feedback path as first feedback voltage, and is connected to the monitoring circuit via the second feedback path as second feedback voltage.

In an embodiment of the invention, the circuit furthermore comprises a second resistance element, which is connected in series with the first resistance element with respect to the signal current, wherein the voltage drop across the second resistance element or one of the voltages dependent thereon is connected to the monitoring circuit via the second feedback path as second feedback voltage.

In another further development of this embodiment of the invention, the second feedback path comprises a differential amplifier, whose output voltage is a function of the voltage drop across the second resistance element, wherein the output voltage of the differential amplifier is connected to the monitoring circuit via the second feedback path as second feedback voltage.

In an embodiment of the invention, the first controlled voltage source and the second controlled voltage source each comprise an analog switch, wherein both switches are controlled from the switch output of a micro controller in order to produce the pulse width modulated voltage.

The measurement transduce according to the invention comprises a sensor for providing a measurement value dependent signal; a signal processing circuit for determining a target value on the basis of the measurement value dependent signal, wherein the target value equals the measurement value; and a circuit according to the invention for regulating and monitoring a signal current, which represents the target value.

BRIEF DESCRIPTION OF THE DRAWINGS

Further peculiarities and considerations of the invention are now explained on the basis of the embodied examples depicted in the figures.

DETAILED DISCUSSION IN CONJUNCTION WITH THE DRAWINGS

Figure 1:
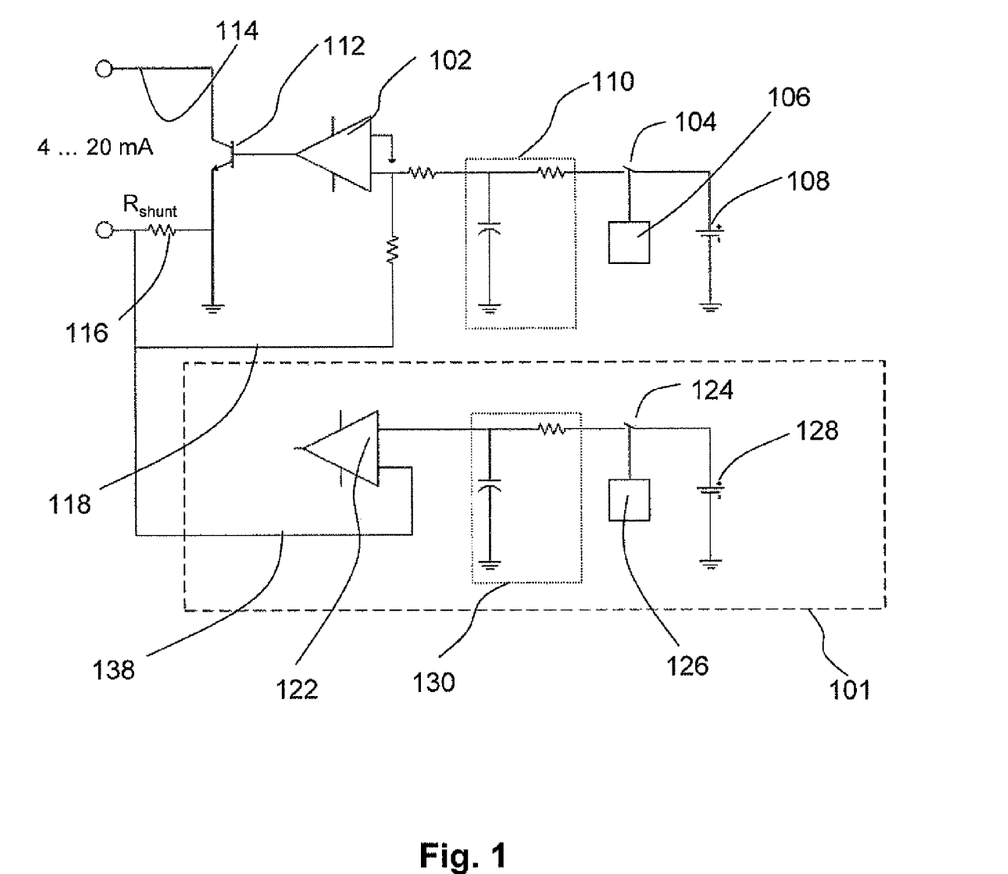
FIG. 1: is a schematic circuit diagram of the first embodied example of the present invention.

The circuit 1 depicted in FIG. 1 for regulating and monitoring signal current comprises a regulating circuit 100 and a monitoring circuit 101. The regulating circuit comprises an operational amplifier 102, whose inverted input is connected to a node where the sum of a controlled voltage and a feedback voltage is formed. The non-inverted input of the operational amplifier 102 is connected to ground. The controlled voltage is provided via a controlled voltage source, which is constructed as follows. An analog switch 104 is controlled by means of an output of a micro controller for the purpose of pulse width modulation in order to output pulse width modulated voltage from a reference voltage source 108, which can, by way of example, be an LT1790 with an output voltage of 2.5V from the company Linear Technology, to an integrator circuit 110, wherein the analog switch 104, the first voltage reference and the first integrator circuit 110 together form the voltage source. The output of the operational amplifier 102 is connected to the base of a transistor 112, which adjusts a signal current in a two wire circuit 114 between 4 and 20 mA. A first resistance element, or shunt resistor 116 respectively, is arranged in the two wire circuit, wherein the voltage after the shunt resistor 116 is added, via a feedback path 118 as feedback voltage, to the controlled voltage at a node at the inverted input of the operational amplifier 102, where said controlled voltage is outputted by the controlled voltage source. The monitoring circuit 101 comprises a second controlled voltage source, which is essential equivalent to the first controlled voltage source in construction and function, wherein the second controlled voltage source comprises a second reference voltage source 128, which can once again be an LT1790 from the company Linear Technology, wherein the second voltage reference 128 is connected to an integrator circuit 130, via a second analog switch 124, which is likewise controlled by the output of a micro controller 126 for pulse width modulation. The switch output for controlling the second analog switch 124 can be a switch output equivalent to the one for controlling the first analog switch 104. The controlled voltage from the second controlled voltage source, which is outputted by the integrator circuit 130, is connected to the non-inverted input of a second operational amplifier 122. The feedback voltage is supplied to the inverted input of the second operational amplifier 122 via a second feedback path 138.

Hence, the functionality of the circuit according to the invention unfolds according to the following:

In the following treatment, let the circuit grounds be as though connected to zero potential. The operational amplifier 102 continuously controls the base of the transistor so that the sum of the feedback voltage, which is supplied to the node at the inverted input of the operational amplifier 102 via the first feedback path 118, and the first controlled voltage, which is likewise connected to the node, takes on the value zero. The same feedback voltage is supplied via a second feedback path 138 to the inverted input of the second operational amplifier 122 in the monitoring circuit, wherein the second controlled voltage is connected to the second operational amplifiers 122 non-inverted input. If the sum of both voltages is likewise zero, then the second operational amplifier does not output an error signal. In so far as the essential components of the first controlled voltage source and the second controlled voltage source have essentially the same functions and dimensions, the first controlled voltage should be equivalent to the second controlled voltage, which then in turn requires that no error signal be outputted by the second operational amplifier 122. However, if an alteration arises in the characteristic properties of one of the components in either the first controlled voltage source block or the second controlled voltage source block, then this leads perforce to a deviation between the input signals of the first operational amplifier 122, so that an error can be detected and signalized.

Figure 2:
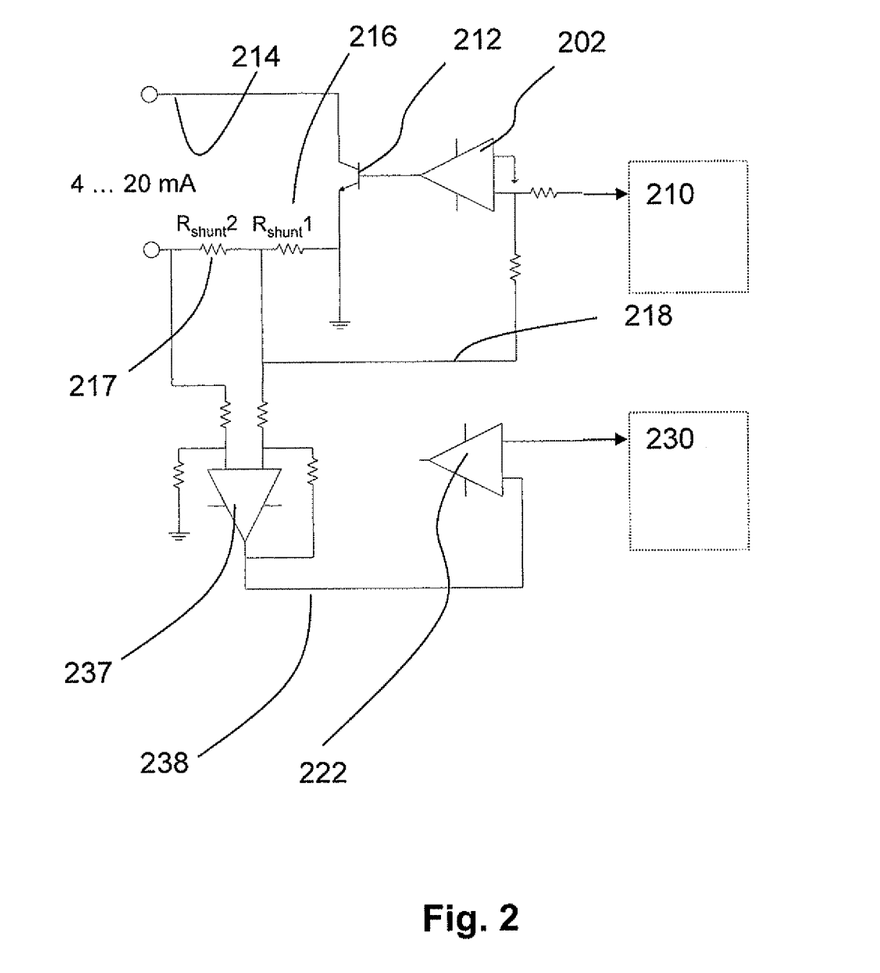
FIG. 2: is a schematic circuit diagram of a second embodied example of the present invention.

In the following embodied examples, the first controlled voltage source and the second controlled voltage source are each constructed exactly as are the first and the second controlled voltage sources of the first embodied example so that the controlled voltage sources in the drawings can be left out. Additionally for the purpose of simplification, equivalent components in the embodied examples are designated by the same numbers in the ones place and tens place values. Accordingly, the equivalent components differentiate themselves between the embodied examples only through the number in the hundreds place value. In accordance with this, the reference character (→210) in FIG. 2 refers, by way of example, to the connection to the integrator of the first controlled voltage source that is here no longer depicted, and the reference character (→230) refers to the connection to the integrator of the second controlled voltage source that is likewise here no longer depicted. In the same sense, the corresponding is true for the other embodiments. The second embodied example comprises, as before, a first operational amplifier 202, which controls a transistor 212 in dependence on the first controlled voltage that is provided via the integrator 210 in order to adjust the current in a current circuit 214. The voltage drop across a first resistor 216 in the current circuit is supplied to a node via a first feedback path 210, to which (node) the integrator of the first controlled voltage source is likewise connected, and which defines the input signal for the inverted input of the first operational amplifier 202. In contrast to the first embodied example, the second embodied example differs in that now the shunt resistor 216 can also be monitored. For this, a second shunt resistor 217 is connected in series with the first shunt resistor in the current circuit 214, wherein the voltage drop across the second shunt resistor 217 is supplied, via a differential amplifier 237 and a second feedback path 238, to the inverted input of a second operational amplifier 222, to whose non-inverted input the integrator 230 of a second controlled voltage source is connected. The second shunt resistor 217 can comprise in particular the same resistance value as the first shunt resister 216. As in the first embodied example, deviations between the controlled voltage sources lead to a discrepancy between the two inputs of the second operational amplifier 222, which leads to the output of an error 71. Furthermore, an alteration in the resistance ratio between the first shunt resistor 216 and the second shunt resistor 217 likewise leads to a discrepancy in the inputs of the second operational amplifier 222, whereby an error signal is set off. Thus, all analog components that are involved in regulating the output current onto the two wire circuit 214 are monitored.

Figure 3:
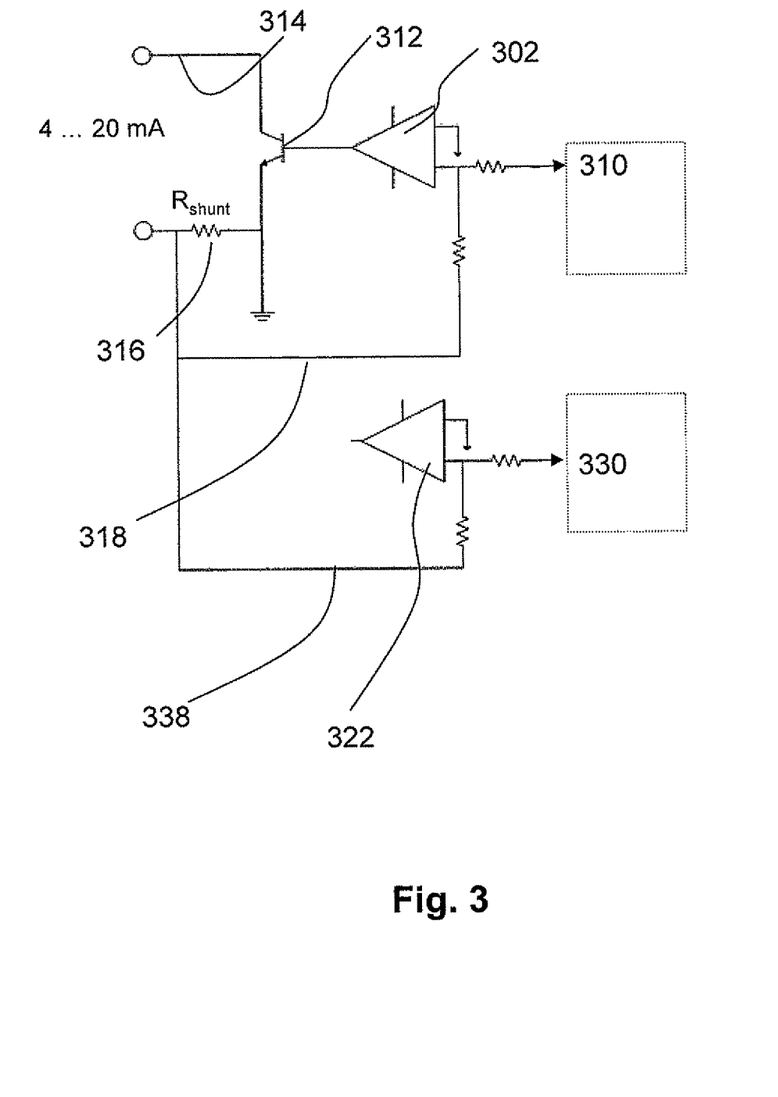
FIG. 3: is a schematic circuit diagram of a third embodied example of the present invention.

The third embodied example in FIG. 3 differentiates itself from the first embodied example by the nature of the connections of the second feedback branch. The monitoring circuit here comprises namely a second operational amplifier 322, whose inverted input is connected to a node, to which the sum of a feedback voltage and a second controlled voltage is connected, wherein this feedback voltage is tapped across a shunt resistor 316 in a current circuit 314 and supplied to the node via a second feedback path 338, wherein the non-inverted input of the second operational amplifier is connected to ground. In this respect, the circuitry of the second operational amplifier is equivalent to the circuitry of the first operational amplifier 302, wherein this circuitry scheme was discussed in conjunction with the first embodied example.

Figure 4:
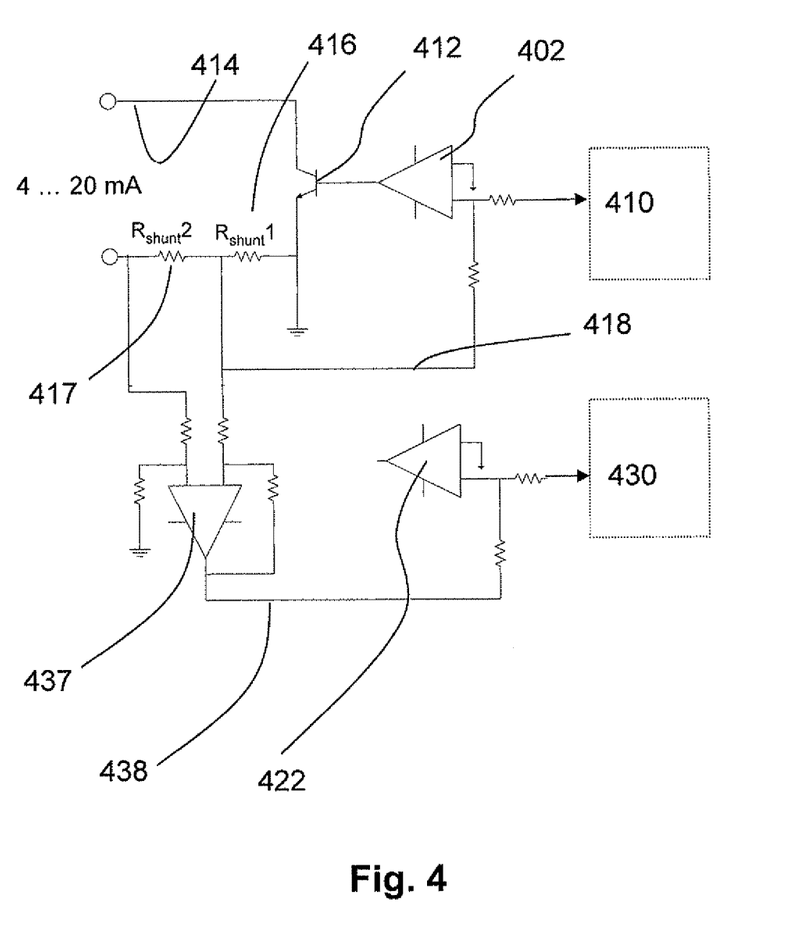
FIG. 4: is a schematic circuit diagram of a fourth embodied example of the present invention.

The fourth embodied example in FIG. 4 addresses the monitoring of the first shunt resistor in the current regulating circuit through a second shunt resistor connected in series with it, as was discussed in conjunction with the second embodied example. In addition, the inverted input of the operational amplifier 422 of the monitoring circuit is connected to a node, to which the sum of the second controlled voltage and the second feedback voltage is connected, where said feedback voltage is dependent on the voltage drop across the second shunt resistor 417.

Figure 5:
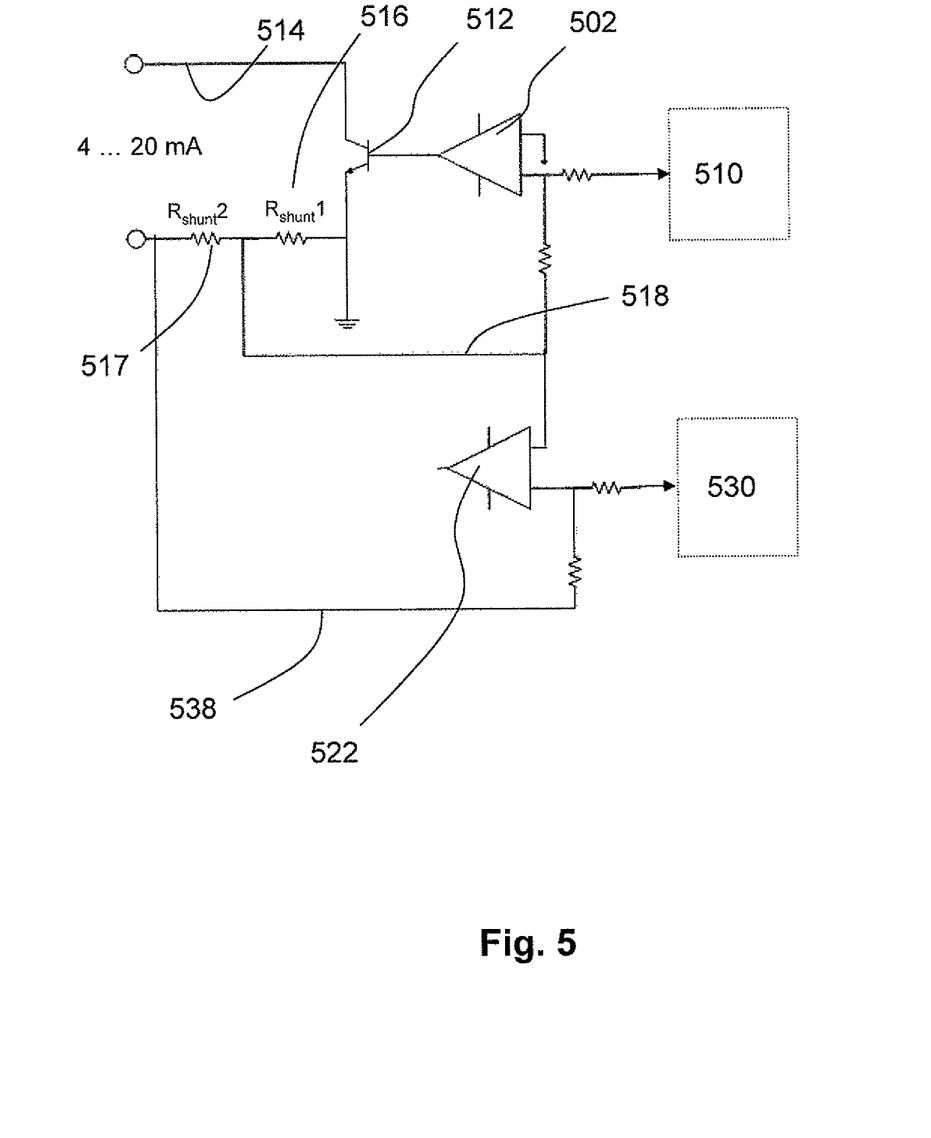
FIG. 5: is a schematic circuit diagram of a fifth embodied example of the present invention.

The fifth embodied example shown in FIG. 5 likewise comprises a monitoring circuit, wherein the inverted input of the second operational amplifier 522 is connected to a node that is supplied with a second controlled voltage 530 and a second feedback voltage via a second feedback path 538. In this case, a first feedback voltage, which registers the voltage drop across the first shunt resistor 516 and is supplied to the node at the inverted input of the first operational amplifier via a first feedback path 518, is also connected to the non-inverted input of the second operational amplifier. With this circuit, deviations between the first and the second resistor or between the first and second controlled voltages output by the first controlled voltage source and the second controlled voltage source lead to discrepancies in the inputs of the second operational amplifier 522 and hence, to an error message.

In summary it must be concluded that the nature of the actuation means of the operational amplifier in the regulating circuit and monitoring circuit and the nature of the supply of feedback voltages can be realized in various ways, which can be combined with each other at will by someone skilled in the art in order to enable the monitoring of the current adjustment according to the invention by monitoring the controlled voltage sources and, as the case may be, the shunt resistor.

The invention claimed is:

1. Circuit for regulating and monitoring a signal current, which represents a target value, wherein the target value is in particular a measurement value or a regulating value, comprising:
  a regulating circuit; and
  a monitoring circuit, wherein:
  said regulating circuit comprises: a first controlled voltage source for outputting a target value dependent controlled voltage; a current adjust circuit for adjusting the signal current in dependence on the controlled voltage and a first feedback voltage by means of a potentiometer; a first feedback path, with at least one first resistance element across which the signal current flows, wherein the voltage drop across the resistance element or one of the voltages of said current adjust circuit dependent thereon is supplied as a first feedback voltage; and
  said monitoring circuit comprises: a second controlled voltage source for outputting a second target value dependent controlled voltage; an analog monitoring circuit for determining the deviation between the second controlled voltage and a second feedback voltage; and a second feedback path with a resistance element across which the signal current flows, wherein the voltage drop across the resistance element or a voltage of the monitoring circuit dependent thereon is supplied as a second feedback voltage.

2. The circuit according to claim 1, wherein:
  the first controlled voltage source and the second controlled voltage source each comprise an integrator circuit for integrating a pulse-width modulated reference voltage.

3. The circuit according to claim 2, wherein:
  both of said integrator circuits comprise essentially the same time constant.

4. The circuit according to claim 1, wherein:
  the first controlled voltage source and the second controlled voltage source each comprise a reference voltage source for outputting a reference voltage.

5. The circuit according to claim 1, wherein:
  said current adjust circuit comprises a first operational amplifier for controlling a transistor circuit by means of its output voltage;
  the signal current is adjusted via the resistance of the transistor circuit, and
  the output voltage of the first operational amplifier depends on a deviation between the first controlled voltage and the first feedback voltage; and
  said monitoring circuit comprises a second operational amplifier for signalizing a deviation by means of its output voltage, the output voltage of the second operational amplifier depends on a deviation between the second controlled voltage and the second feedback voltage.

6. The circuit according to claim 5, wherein:
  a first input of the first operational amplifier is connected to a node to which the sum of the first controlled voltage and the first feedback voltage connects in the operation of the circuit; and
  a second input of the first operational amplifier is connected to ground.

7. The circuit according to claim 5, wherein:
  the first feedback voltage connects to a first input of the first operational amplifier in the operation of the circuit, and the first controlled voltage connects to a second input of the first operational amplifier.

8. The circuit according to claim 5, wherein:
a first input of the second operational amplifier is connected to a node to which the sum of the second controlled voltage and the second feedback voltage connects in the operation of the circuit; and
the second input of the second operational amplifier is connected to ground.

9. The circuit according to claim 5, wherein:
the first feedback voltage is connected to a first input of the second operational amplifier in the operation of the circuit; and
the second controlled voltage is connected to a second input of the operational amplifier.

10. The circuit according to claim 1, wherein:
in the operation of the circuit, the voltage drop across the first resistance element is connected to the current adjust circuit via the first feedback path as a first feedback voltage, and is connected to the monitoring circuit via the second feedback path as a second feedback voltage.

11. The circuit according to claim 1, further comprising:
a second resistance element, which is connected in series with the first resistance element with respect to the signal current, wherein:
the voltage drop across the second resistance element or one of the voltages dependent thereon is connected to the monitoring circuit via the second feedback path as second feedback voltage.

12. The circuit according to claim 11, wherein:
the second feedback path comprises a differential amplifier, whose output voltage is a function of the voltage drop across the second resistance element; and
the output voltage of the differential amplifier is connected to the monitoring circuit via the second feedback path as second feedback voltage.

13. The circuit according to claim 2, wherein:
the first controlled voltage source and the second controlled voltage source each comprise an analog switch; and
both switches are controlled from the switch output of a micro controller in order to produce the pulse width modulated voltage.

14. A measurement transducer, comprising:
a sensor for providing a measurement value dependent signal; and
a signal processing circuit for determining a target value on the basis of the measurement value dependent signal, wherein:
the target value equals the measurement value; and
a circuit for regulating and monitoring a signal current, which represents a target value, comprising:
a regulating circuit; and
a monitoring circuit, wherein:
said regulating circuit comprises: a first controlled voltage source for outputting a target value dependent controlled voltage; a current adjust circuit for adjusting the signal current in dependence on the controlled voltage and a first feedback voltage by means of a potentiometer; a first feedback path, with at least one first resistance element across which the signal current flows, wherein the voltage drop across the resistance element or one of the voltages of said current adjust circuit dependent thereon is supplied as a first feedback voltage; and
said monitoring circuit comprises: a second controlled voltage source for outputting a second target value dependent controlled voltage; an analog monitoring circuit for determining the deviation between the second controlled voltage and a second feedback voltage; and a second feedback path with a resistance element across which the signal current flows, wherein the voltage drop across the resistance element or a voltage of the monitoring circuit dependent thereon is supplied as a second feedback voltage.

* * * * *